US011801898B2

(12) United States Patent
Gerczak et al.

(10) Patent No.: US 11,801,898 B2
(45) Date of Patent: Oct. 31, 2023

(54) DEFORMABLE BRACKET FOR TRANSLATING VEHICLE FUEL BOX

(71) Applicant: Toyota Motor Engineering & Manufacturing North America, Inc., Plano, TX (US)

(72) Inventors: Mitch J. Gerczak, Ann Arbor, MI (US); Mark D. Clauser, Saline, MI (US); Brian L. Tew, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 712 days.

(21) Appl. No.: 17/002,630

(22) Filed: Aug. 25, 2020

(65) Prior Publication Data

US 2022/0063726 A1    Mar. 3, 2022

(51) Int. Cl.
*B62D 21/15*    (2006.01)
*B60K 15/063*    (2006.01)
*B60K 15/04*    (2006.01)
*B60K 15/05*    (2006.01)

(52) U.S. Cl.
CPC ............ *B62D 21/152* (2013.01); *B60K 15/04* (2013.01); *B60K 15/05* (2013.01); *B60K 15/063* (2013.01); *B60K 2015/0553* (2013.01); *B60K 2015/0638* (2013.01)

(58) Field of Classification Search
CPC ............ B60K 15/04; B60K 2015/0553; B60K 2015/0474; B60K 15/077; B60K 2015/0675; B60Y 2306/01
See application file for complete search history.

(56) References Cited

U.S. PATENT DOCUMENTS

| 5,560,651 | A | 10/1996 | Kami |
| 7,422,242 | B2 | 9/2008 | Matsumoto et al. |
| 9,150,098 | B2 * | 10/2015 | Fujiwara ............... B60K 15/01 |
| 10,556,504 | B2 * | 2/2020 | Eulitz .................. F16L 3/1226 |
| 10,906,392 | B2 * | 2/2021 | Padilla Heredia ........................... B60K 15/03504 |

(Continued)

FOREIGN PATENT DOCUMENTS

| DE | 4408573 C2 | 9/1994 | |
| DE | 10153391 A1 * | 5/2003 | ............ B62D 21/15 |
| FR | 3055115 A1 * | 2/2018 | ............ B60K 15/01 |

(Continued)

*Primary Examiner* — Drew J Brown
*Assistant Examiner* — Tiffany L Webb
(74) *Attorney, Agent, or Firm* — SNELL & WILMER LLP (57) ABSTRACT

A system for reducing risk of fuel leakage of a vehicle during a collision includes a vehicle main body configured to support and at least partially enclose a passenger. The system further includes a fuel inlet box configured to house a fuel inlet. The system further includes a rear bracket coupled to the vehicle main body at a location aft of the fuel inlet box. The system further includes a center shaft coupled to the rear bracket and extending forward from the rear bracket. The system further includes a forward bracket coupled to the vehicle main body at a location forward relative to the rear bracket and coupled to the center shaft, the forward bracket configured to deform in response to a rear collision of the vehicle to actuate the fuel inlet box in order to reduce the likelihood of a fuel leak from the fuel inlet.

20 Claims, 5 Drawing Sheets

(56) References Cited

U.S. PATENT DOCUMENTS

2017/0320387 A1 11/2017 Bowers
2021/0001717 A1* 1/2021 Wilhelm ................... F16L 3/02

FOREIGN PATENT DOCUMENTS

FR 3081126 A1 5/2018
JP 2004330855 A 5/2003
JP 2006103445 A 10/2004

* cited by examiner

DEFORMABLE BRACKET FOR TRANSLATING VEHICLE FUEL BOX

BACKGROUND

1. Field

The present disclosure relates to systems and methods for reducing fuel leak of a vehicle during or after a collision.

2. Description of the Related Art

Vehicle technology is rapidly advancing in many different areas of the vehicles. For example, increases in computing power and sensors are allowing vehicle manufacturers to design autonomous vehicles that can drive themselves with little or no driver input. Many advancements in vehicle technology are also directed to vehicle safety features. For example, vehicles are being designed with advanced airbags that reduce the effects of a collision on drivers and passengers, and main vehicle bodies are designed to absorb more force upon impact to reduce force transferred to people in the vehicle cabin.

It is desirable to reduce or eliminate fuel leakage from a vehicle as an effect of a collision. Fuel may leak in various locations such as from a fuel tank, from a fuel pump in the engine, from piping between the fuel tank and the fuel pump, from a fuel inlet, or between the fuel inlet and the fuel tank. It is therefore desirable to reduce or eliminate fuel leakage from all of these locations in response to collisions.

SUMMARY

Described herein is a system for reducing risk of fuel leakage of a vehicle during a collision. The system includes a vehicle main body designed to support and at least partially enclose a passenger. The system further includes a fuel inlet box designed to house a fuel inlet. The system further includes a rear bracket coupled to the vehicle main body at a location aft of the fuel inlet box. The system further includes a center shaft coupled to the rear bracket and extending forward from the rear bracket. The system further includes a forward bracket coupled to the vehicle main body at a location forward relative to the rear bracket and coupled to the center shaft, the forward bracket designed to deform in response to a rear collision of the vehicle to actuate the fuel inlet box in order to reduce the likelihood of a fuel leak from the fuel inlet.

Also described is a system for reducing risk of fuel leakage of a vehicle during a collision. The system includes a vehicle main body designed to support and at least partially enclose a passenger. The system further includes a fuel inlet box designed to house a fuel inlet. The system further includes a rear bracket coupled to the vehicle main body at a location aft of the fuel inlet box. The system further includes a center shaft coupled to the rear bracket and extending forward from the rear bracket. The system further includes a forward bracket coupled to the vehicle main body at a location forward relative to the rear bracket and coupled to the center shaft, the forward bracket designed to deform in response to a rear collision of the vehicle to actuate the fuel inlet box in an outward direction relative to the vehicle main body.

Also described is a system for reducing risk of fuel leakage of a vehicle during a collision. The system includes a vehicle main body designed to support and at least partially enclose a passenger. The system further includes a fuel inlet box designed to house a fuel inlet. The system further includes a rear bracket permanently coupled to the vehicle main body at a location aft of the fuel inlet box. The system further includes a center shaft permanently coupled to the rear bracket and extending forward from the rear bracket. The system further includes a forward bracket permanently coupled to the vehicle main body at a location forward relative to the rear bracket and defining a beam pocket designed to receive the center shaft to couple the center shaft to the forward bracket, the forward bracket designed to deform in response to a rear collision of the vehicle to actuate the fuel inlet box in order to reduce the likelihood of a fuel leak.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for reducing fuel leak of a vehicle in response to a collision. The system provides various benefits and advantages such as moving a fuel inlet box away from a fuel inlet of the vehicle in response to a rear collision of the vehicle. This movement of the fuel inlet box advantageously reduces interaction between the fuel inlet box and the fuel inlet in response to the collision, reducing or eliminating damage to the fuel inlet. The reduction in damage to the fuel inlet beneficially reduces the likelihood of a fuel leak from the fuel inlet. By reducing the likelihood of damage to the fuel inlet, the present systems further advantageously reduce repair costs of the vehicle, thus saving a driver time and money.

An exemplary system includes a fuel inlet housed within a fuel inlet box. The system further includes a pusher bracket that includes a forward bracket, a rear bracket located closer to a rear of the vehicle than the forward bracket, and a center shaft connecting the forward bracket to the rear bracket. The rear bracket, the center shaft, and the forward bracket may each be formed of steel. The forward bracket may be at least partially aligned with the fuel inlet box. In response to a collision involving a rear of the vehicle, the rear bracket applies a force to the forward bracket via the center shaft. The forward bracket is designed to deform in such a way that the deformation actuates the fuel inlet box away from the fuel inlet. This actuation of the fuel inlet box reduces the likelihood of interaction between the fuel inlet box and the fuel inlet during a collision, thus reducing the likelihood of damage to the fuel inlet.

Figure 1:
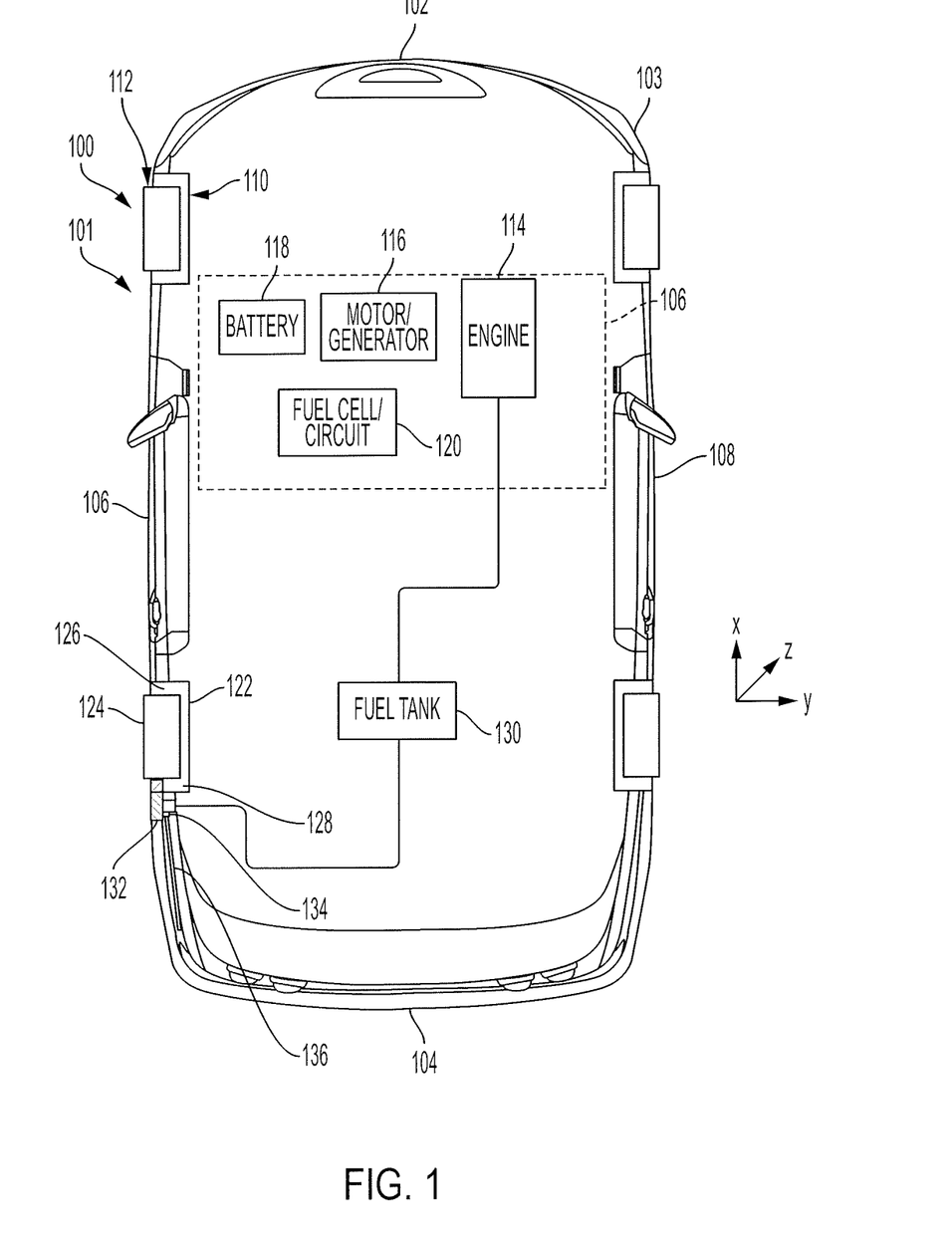
FIG. 1 is a block diagram illustrating a vehicle having a system for reducing risk of fuel leakage in response to a collision according to an embodiment of the present invention.

Turning to FIG. 1, a vehicle 100 may include a system 101 for reducing risk of fuel leakage from the vehicle 100 in response to a collision. The vehicle 100 may include a vehicle main body 103 that defines a passenger compartment and forms a structure of the vehicle. The vehicle main body 103 may include a front 102, a rear 104, a first side 106, and a second side 108. An X-Y-Z axis is shown throughout the drawings to illustrate a forward-rearward direction (X), a side-to-side direction (from the first side 106 to the second side 108), and a vertical direction (Z). The vehicle 100 may further include a power source 106, a fuel tank 130, a fuel inlet box 132, and a fuel inlet 134. The vehicle 100 may also include a plurality of wheelhouses 110 each designed to house a wheel 112. The wheelhouses 110 may be part of the vehicle main body 103 or may be separate components.

The fuel inlet box 132 is designed to house the fuel inlet 134. In that regard, the fuel inlet box 132 may have a door that can be closed to enclose the fuel inlet 134 and be opened to allow access to the fuel inlet 134. Fuel may be received by the fuel inlet 134 and may travel along a tube, pipe, or other passageway towards the fuel tank 130. The fuel in the fuel tank 130 may be received by the engine 114.

The power source 106 may include any one or more of an engine 114, a motor-generator 116, a battery 118, and a fuel cell circuit 120.

The engine 114 may receive fuel from the fuel tank 130 and may convert the fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like. The battery 118 may be used to store electrical energy usable by the motor generator 116, electrical energy usable to start the engine 114, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The wheelhouses 110 may include a rear wheelhouse 122, and the wheels 112 may include a rear wheel 124 housed within the rear wheelhouse 122. The rear wheelhouse 122 may include an inner wheelhouse 128 and an outer wheelhouse 126. The inner wheelhouse 128 may be closer to the second side 108 than the outer wheelhouse 126. The fuel inlet box 132 may be at least partially aligned with the rear wheelhouse 122. The fuel inlet 134 may be at least partially located within the fuel inlet box 132. In some embodiments, the fuel inlet box 132 may be a separate component from the vehicle main body 103.

In response to a rear collision of the vehicle 100, the inner wheelhouse 128 may move relative to the outer wheelhouse 126. This relative movement may result in shear force between the inner wheelhouse 128 and the outer wheelhouse 126. This sheer force may cause the fuel inlet 134 to press against the fuel inlet box 132, thus warping or deforming the fuel inlet 134. In response to this deformation, increased risk of fuel leak from the fuel inlet 134 may exist.

In order to reduce the deformation of the fuel inlet 134, it is desirable for the fuel inlet box 132 to be actuated outward from the vehicle main body 103 in response to a collision (i.e., it is desirable for the fuel inlet box 132 to be actuated away from the second side 108). In that regard, the pusher bracket 136 may be designed to deform in such a way that it forces the fuel inlet box 132 outward relative to the vehicle main body 103.

Figure 2A:
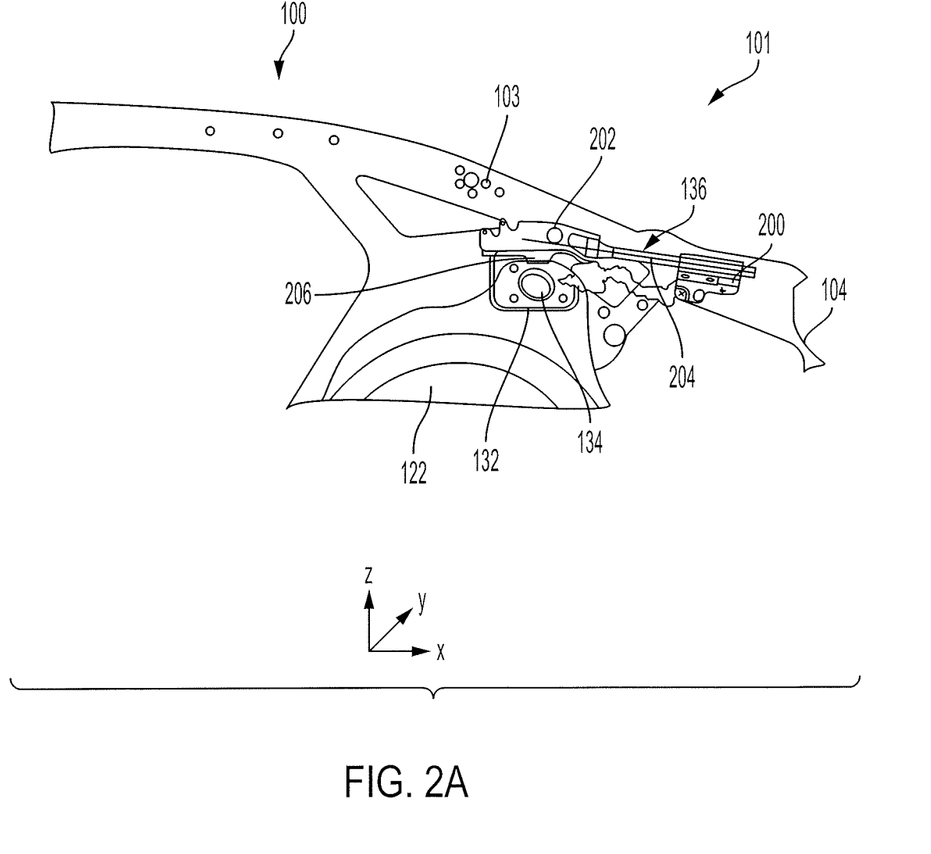
FIGS. 2A and 2B are drawings illustrating a cross-sectional view of the vehicle and system of FIG. 1 according to an embodiment of the present invention.
Figure 2B:
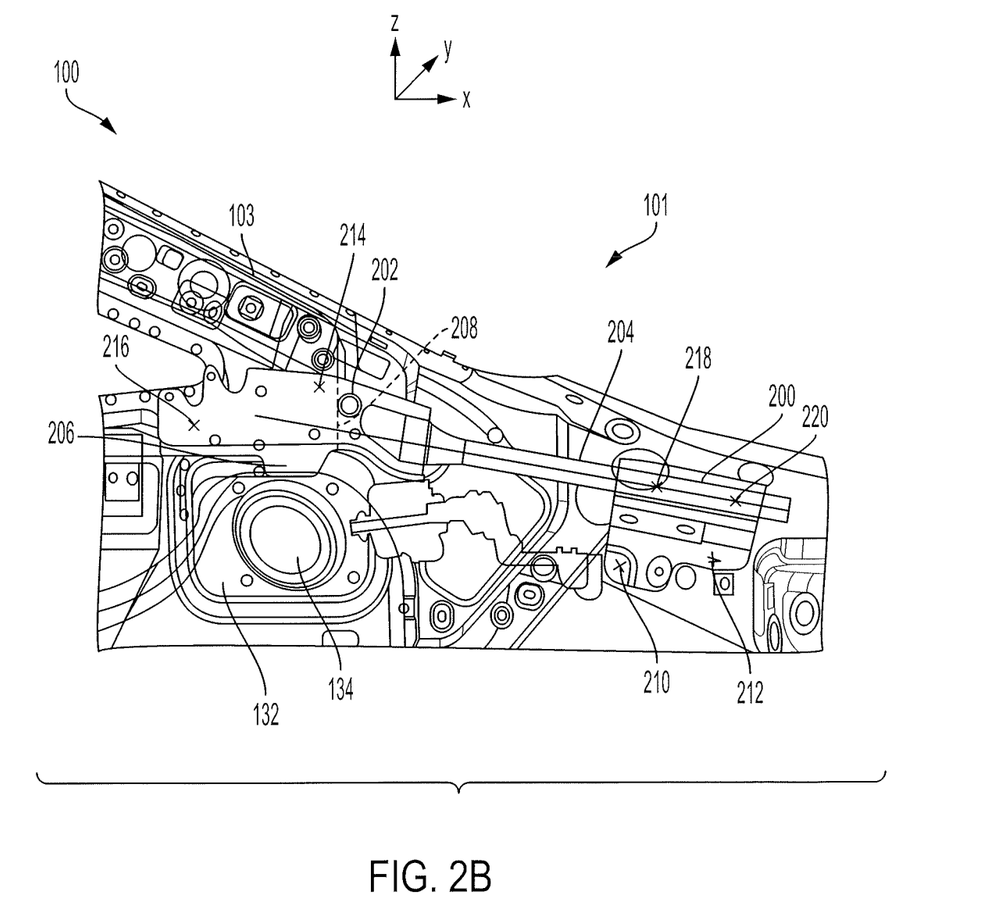

Referring now to FIGS. 1, 2A, and 2B, a side view of the vehicle 100 and the system 101 is shown in FIGS. 2A and 2B. As shown, the pusher bracket 136 is at least partially aligned with the fuel inlet box 132 along the Y direction. The pusher bracket 136 includes a rear bracket 200 coupled to the vehicle main body 103, a center shaft 204 coupled to the rear bracket 200, and a forward bracket 202 coupled to the vehicle main body 103 and to the pusher bracket 136. For example, the rear bracket 200 may be welded to the vehicle main body 103 (for example, at locations 210 and 212), the center shaft 204 may be welded to the rear bracket 200 (for example, at locations 218 and 220), the forward bracket 202 may be welded to the vehicle main body 103 (for example, at locations 214 and 216), and the forward bracket 202 may be coupled to the center shaft 204 via an interference fit (or any other type of coupling). The center shaft may include, for example, a formed beam or any other primary member such as a piece of rigid stamped sheet metal.

Figure 3:
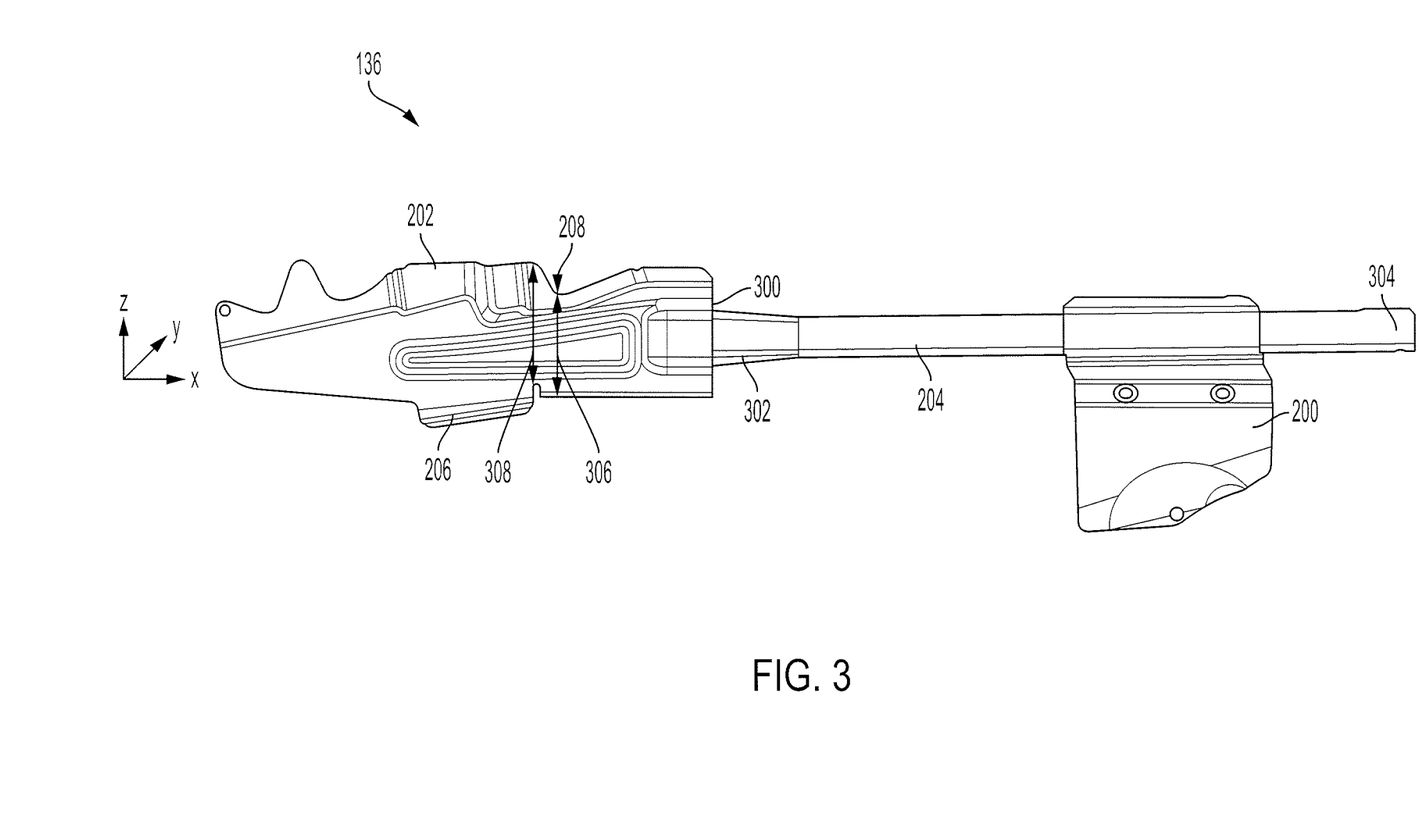
FIG. 3 is a drawing illustrating a pusher bracket of the system of FIG. 1 according to an embodiment of the present invention.

For example and with brief reference to FIG. 3, the forward bracket 202 may define a beam pocket 300. The beam pocket 300 may be sufficiently large as to receive a forward end 302 of the center shaft 204. As shown, the rear bracket 200 is coupled to the center shaft 204 at a location near a rear end 304 of the center shaft 204.

Returning reference to FIGS. 1, 2A, and 2B and in response to a collision at the rear 104 end of the vehicle 100, the rear bracket 200 may be actuated forward. This actuation of the rear bracket 200 may actuate the center shaft 204 forward, thus applying pressure to the forward bracket 202. The forward bracket 202 may be designed to bend at a hinge location 208 such that the hinge location 208 is pushed outward (i.e., away from the second side 108). In response to the pressure applied to the forward bracket 202, the forward bracket 202 may bend at the hinge location 208. The forward bracket 202 may further include a flange 206 aligned with the fuel inlet box 132 along the Y direction. In some embodiments, the flange 206 may be welded or otherwise coupled to the fuel inlet box 132. In some embodiments, the flange 206 may be located adjacent to the fuel inlet box 132 without coupling the flange 206 to the fuel inlet box 132.

In response to the forward bracket 202 bending, the flange 206 may actuate the fuel inlet box 132 outward and may rotate the fuel inlet box 132 in a clockwise direction. For example, the fuel inlet box 132 may be moved outward by between 5 millimeters (5 mm) and 25 mm (0.20 inches and 0.98 inches), between 10 mm and 15 mm (0.39 inches and 0.59 inches), or about 13 mm (0.51 inches). Where used in this context, about refers to the referenced value plus or minus 10 percent (10%) of the referenced value. For example, the fuel in box 132 may be rotated between 30 degrees (30°) and 65°, between 40° and 55°, or between 45° and 50°. This actuation of the fuel inlet box 132 may be sufficient to reduce or eliminate contact between the fuel inlet box 132 and the fuel inlet 134 in response to a rear collision of the vehicle 100.

Turning now to FIG. 3, the pusher bracket 136 may include one or more features that facilitate bending of the forward bracket 202 at the hinge location 208. For example, the forward bracket 202 may have a width 306 at the hinge location 208 that is less than a width 308 at other locations of the forward bracket 202. The reduced width 306 at the hinge location 208 results in bending at the hinge location 208 in response to force applied by the center shaft 204.

Figure 4:
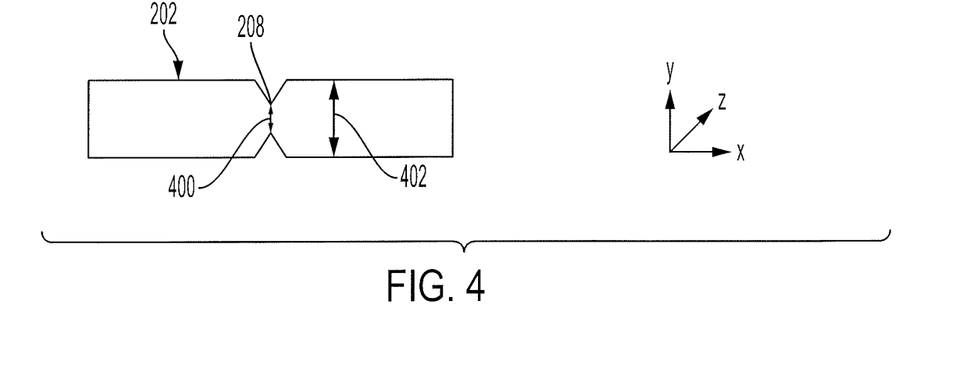
FIG. 4 is a top-down view of a forward bracket of the pusher bracket of FIG. 3 according to an embodiment of the present invention.

As another example and referring to FIGS. 3 and 4, the forward bracket 202 may have a thickness 400 at the hinge location 208 that is less than a thickness 402 at other locations of the forward bracket 202. The reduced thickness 400 at the hinge location 208 results in bending at the hinge location 208 in response to force applied by the center shaft 204.

As yet another example and returning reference to FIG. 3, the forward bracket 202 may include a softer material at the hinge location 208 than at other locations of the forward bracket 202. The softer material at the hinge location 208 results in bending at the hinge location 208 in response to force applied by the center shaft 204.

As yet another example, any alternative or additional geometries of the forward bracket may be designed such that force applied by the center shaft 204 causes bending of the forward bracket 202 at the hinge location 208.

Figure 5:
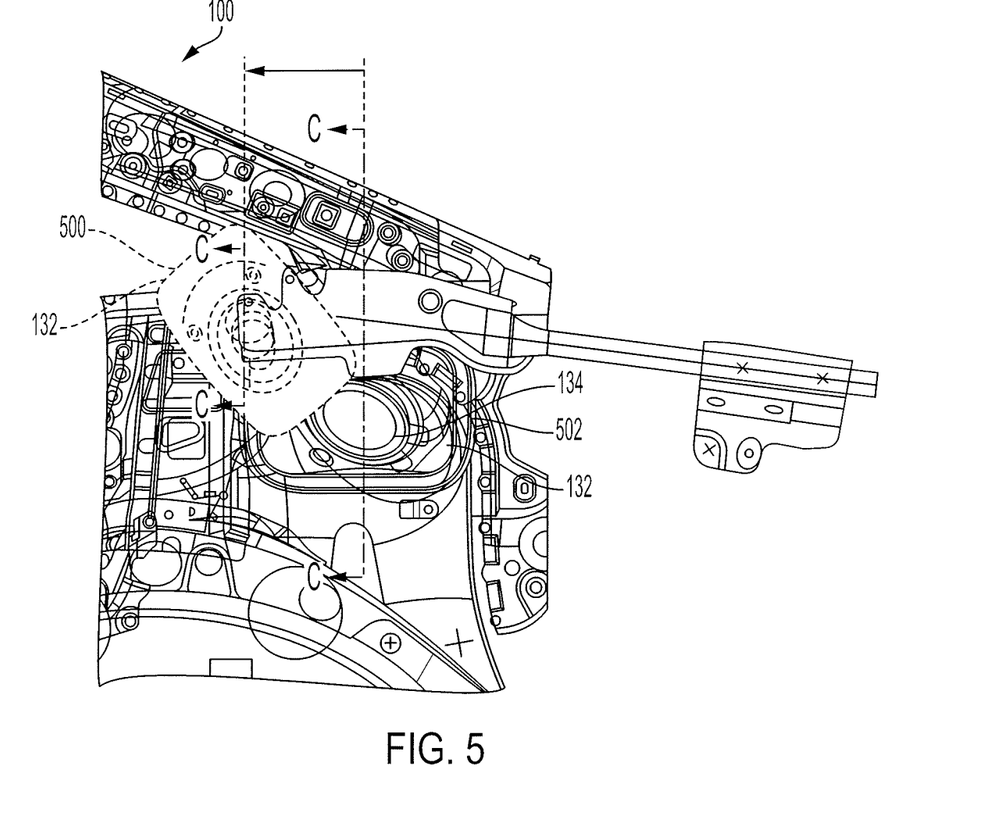
FIG. 5 is a drawing illustrating an effect of the pusher bracket of FIG. 3 on a fuel inlet box of the vehicle of FIG. 1 in response to a collision according to an embodiment of the present invention.

Referring now to FIGS. 3 and 5, a result of a rear collision of the vehicle 100 is shown. As shown by an outline 502, the fuel inlet box 132 and the fuel inlet 134 are both located at their designed location before any collision occurs. As a result of a rear collision, the flange 206 interacts with the fuel inlet box 132 and actuates the fuel inlet box 132 outward from the vehicle main body 103 and rotates the fuel inlet box 132 in a clockwise direction (as shown by an outline 500). As further shown, the fuel inlet 134 remains in its original location such that the actuation of the fuel inlet box 132 reduces or prevents the fuel inlet box 132 from damaging the fuel inlet 134.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing risk of fuel leakage of a vehicle during a collision, the system comprising:
    a vehicle main body configured to support and at least partially enclose a passenger;
    a fuel inlet box configured to house a fuel inlet;
    a rear bracket coupled to the vehicle main body at a location aft of the fuel inlet box;
    a center shaft coupled to the rear bracket and extending forward from the rear bracket; and
    a forward bracket coupled to the vehicle main body at a location forward relative to the rear bracket and coupled to the center shaft, the forward bracket configured to deform in response to a rear collision of the vehicle to actuate the fuel inlet box in order to reduce the likelihood of a fuel leak from the fuel inlet.

2. The system of claim 1 wherein the forward bracket is configured to deform to actuate the fuel inlet box in an outward direction relative to the vehicle main body and to rotate the fuel inlet box relative to the vehicle main body.

3. The system of claim 2 further comprising the fuel inlet configured to be positioned within the fuel inlet box and to receive fuel for refilling the vehicle, wherein the actuation of the fuel inlet box reduces the likelihood of the fuel inlet box contacting the fuel inlet during the collision.

4. The system of claim 2 wherein the forward bracket is at least partially located inward relative to the fuel inlet box.

5. The system of claim 4 wherein the forward bracket includes a hinge location configured to deform in response to the rear collision, and wherein the hinge location is located rearward relative to the fuel inlet box.

6. The system of claim 5 wherein the forward bracket has at least one of a reduced thickness at the hinge location relative to other locations or a reduced width in a direction perpendicular to the center shaft at the hinge location relative to other locations, the at least one of the reduced thickness or the reduced width causing the forward bracket to deform in response to the rear collision.

7. The system of claim 1 wherein the forward bracket defines a beam pocket configured to receive the center shaft such that the forward bracket is coupled to the center shaft via interaction of the beam pocket and the center shaft.

8. The system of claim 7 wherein the rear bracket is permanently coupled to the vehicle main body and to the center shaft, and the forward bracket is permanently coupled to the vehicle main body.

9. The system of claim 1 further comprising a rear wheelhouse configured to at least partially house a rear vehicle wheel, wherein the fuel inlet box is at least partially aligned with the rear wheelhouse.

10. The system of claim 1 wherein the rear bracket, the center shaft, and the forward bracket are combined into an integral component.

11. The system of claim 1 wherein the rear bracket, the center shaft, and the forward bracket are each formed of steel.

12. A system for reducing risk of fuel leakage of a vehicle during a collision, the system comprising:
    a vehicle main body configured to support and at least partially enclose a passenger;
    a fuel inlet box configured to house a fuel inlet;
    a rear bracket coupled to the vehicle main body at a location aft of the fuel inlet box;
    a center shaft coupled to the rear bracket and extending forward from the rear bracket; and
    a forward bracket coupled to the vehicle main body at a location forward relative to the rear bracket and coupled to the center shaft, the forward bracket configured to deform in response to a rear collision of the vehicle to actuate the fuel inlet box in an outward direction relative to the vehicle main body.

13. The system of claim 12 further comprising the fuel inlet configured to be positioned within the fuel inlet box and to receive fuel for refilling the vehicle, wherein:
- the actuation of the fuel inlet box reduces the likelihood of the fuel inlet box contacting the fuel inlet during the collision; and
- the forward bracket is at least partially located inward relative to the fuel inlet box.

14. The system of claim 13 wherein the forward bracket includes a hinge location configured to deform in response to the rear collision, and wherein the hinge location is located rearward relative to the fuel inlet box.

15. The system of claim 14 wherein the forward bracket has at least one of a reduced thickness at the hinge location relative to other locations or a reduced width in a direction perpendicular to the center shaft at the hinge location relative to other locations, the at least one of the reduced thickness or the reduced width causing the forward bracket to deform in response to the rear collision.

16. The system of claim 12 wherein:
- the rear bracket is permanently coupled to the vehicle main body and to the center shaft; and
- the forward bracket is permanently coupled to the vehicle main body and defines a beam pocket configured to receive the center shaft such that the forward bracket is coupled to the center shaft via interaction of the beam pocket and the center shaft.

17. The system of claim 12 further comprising a rear wheelhouse configured to at least partially house a rear vehicle wheel, wherein the fuel inlet box is at least partially aligned with the rear wheelhouse.

18. A system for reducing risk of fuel leakage of a vehicle during a collision, the system comprising:
- a vehicle main body configured to support and at least partially enclose a passenger;
- a fuel inlet box configured to house a fuel inlet;
- a rear bracket permanently coupled to the vehicle main body at a location aft of the fuel inlet box;
- a center shaft permanently coupled to the rear bracket and extending forward from the rear bracket; and
- a forward bracket permanently coupled to the vehicle main body at a location forward relative to the rear bracket and defining a beam pocket configured to receive the center shaft to couple the center shaft to the forward bracket, the forward bracket configured to deform in response to a rear collision of the vehicle to actuate the fuel inlet box in order to reduce the likelihood of a fuel leak.

19. The system of claim 18 further comprising the fuel inlet configured to be positioned within the fuel inlet box and to receive fuel for refilling the vehicle, wherein:
- the forward bracket is configured to deform to actuate the fuel inlet box in an outward direction relative to the vehicle main body and to rotate the fuel inlet box relative to the vehicle main body;
- the actuation of the fuel inlet box reduces the likelihood of the fuel inlet box contacting the fuel inlet during the collision; and
- the forward bracket is at least partially located inward relative to the fuel inlet box.

20. The system of claim 19 wherein:
- the forward bracket includes a hinge location configured to deform in response to the rear collision, wherein the hinge location is located rearward relative to the fuel inlet box;
- the forward bracket has at least one of a reduced thickness at the hinge location relative to other locations or a reduced width in a direction perpendicular to the center shaft at the hinge location relative to other locations; and
- the at least one of the reduced thickness or the reduced width causing the forward bracket to deform in response to the rear collision.

* * * * *